United States Patent [19]

Adams et al.

[11] 4,292,477

[45] Sep. 29, 1981

[54] TELEPHONE SET BASE FOR BOTH WALL AND DESK MOUNTING

[75] Inventors: William J. Adams, Franklin; Steve W. Haskins, Laverne, both of Tenn.

[73] Assignee: Northern Telecom, Inc., Ottawa, Canada

[21] Appl. No.: 78,674

[22] Filed: Sep. 25, 1979

[51] Int. Cl.³ .............................................. H04M 1/02
[52] U.S. Cl. ........................... 179/100 C; 179/100 D; 179/179
[58] Field of Search ............. 179/1 PC, 100 R, 100 D, 179/100 C, 146 R, 147, 178, 179

[56] References Cited

U.S. PATENT DOCUMENTS

| | | | |
|---|---|---|---|
| 3,444,329 | 5/1969 | Krumreich | 179/100 R |
| 3,558,831 | 1/1971 | Prescott et al. | 179/100 R |
| 3,564,164 | 2/1971 | Prescott | 179/103 |
| 3,657,487 | 4/1972 | Schwanck et al. | 179/100 D |
| 3,898,394 | 8/1975 | Ward et al. | 179/178 |
| 4,163,874 | 8/1979 | Lenaerts et al. | 179/179 |

FOREIGN PATENT DOCUMENTS 2536437  9/1976  Fed. Rep. of Germany ...... 179/178

OTHER PUBLICATIONS

W. Ruffer & W. Wernet; "Hands–Free Calling Goes Residential"; GTE Automatic Electric Journal; Mar. 1977; pp. 275–279.

I. Yamagami & K. Shirai; "Small Size Telephone Set Design and Construction"; Review of the Electrical Communications Laboratories; vol. 22, No. 3-4; Mar.-Apr. 1974; pp. 221–226.

*Primary Examiner*—Bernard Konick
*Assistant Examiner*—Randall P. Myers
*Attorney, Agent, or Firm*—Schwartz, Jeffery, Schwaab, Mack, Blumenthal & Koch

[57] ABSTRACT

A telephone set base, for both wall and desk top mounting, has an elongate plastic molded base plate and a top housing. To improve stability a flat metal weight is positioned on the base plate and is spaced a small distance from the base plate to form an acoustic chamber. A speaker is mounted on the weight. A printed circuit board is mounted over the weight and modular jacks are attached to a flexible circuit member which connects to the printed circuit board, speaker, and other items. Recesses are formed in the base plate to provide for alternative arrangements of line cords and plug-in mounting on a wall. Slots in the base plate provide access to the recesses for cords entering at the ends of the base plate. A battery housing is provided.

17 Claims, 8 Drawing Figures

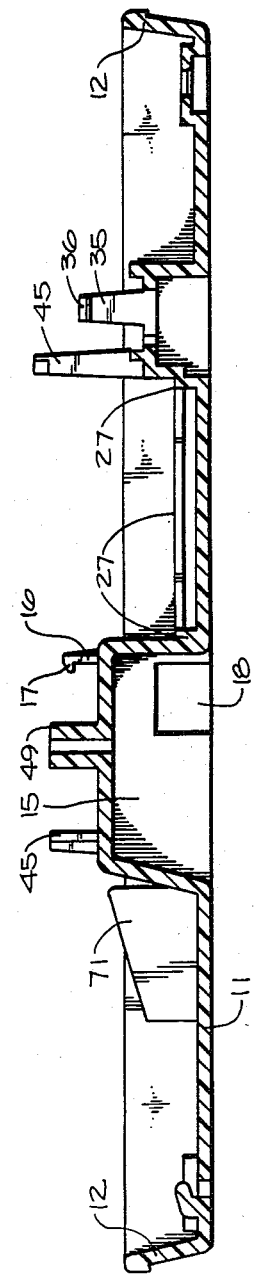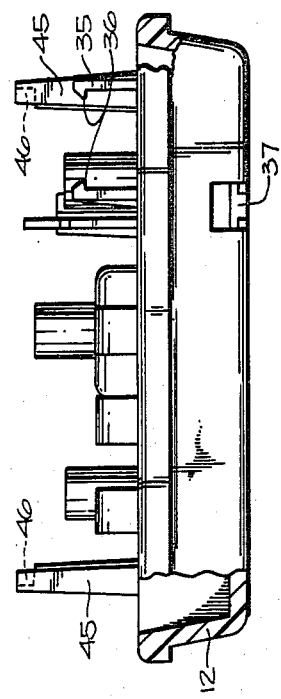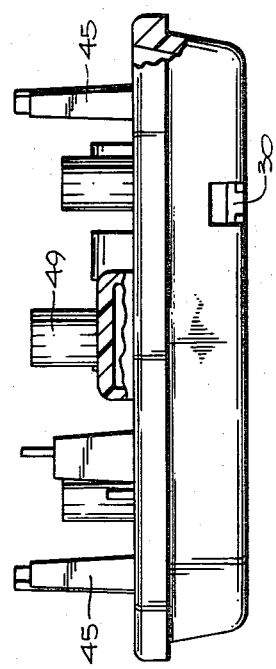

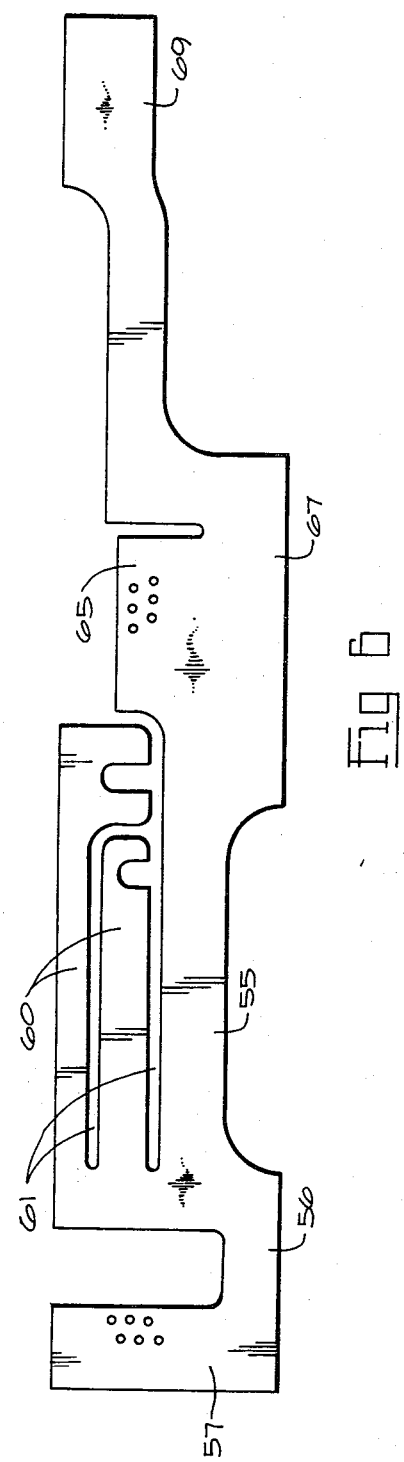

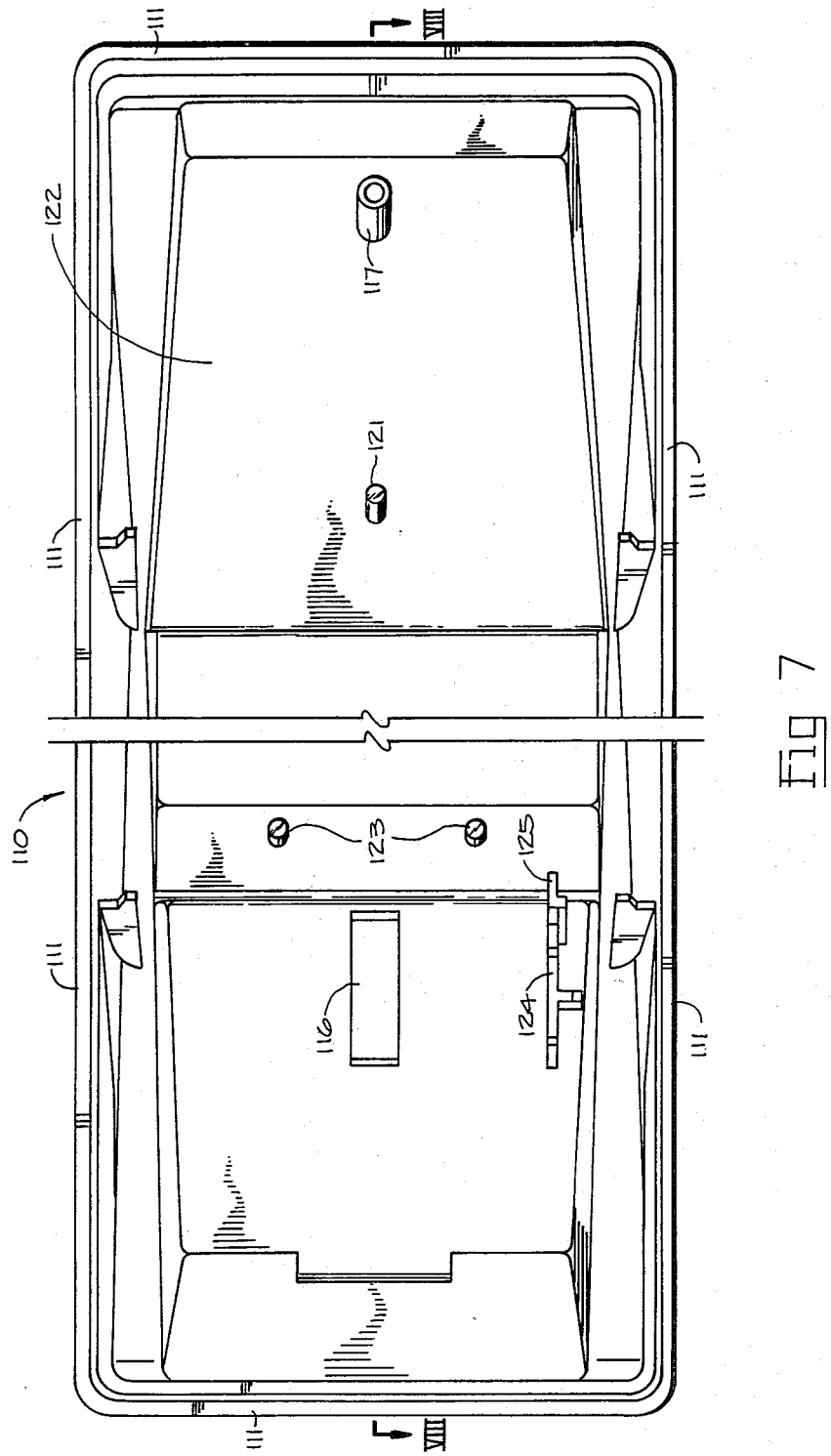

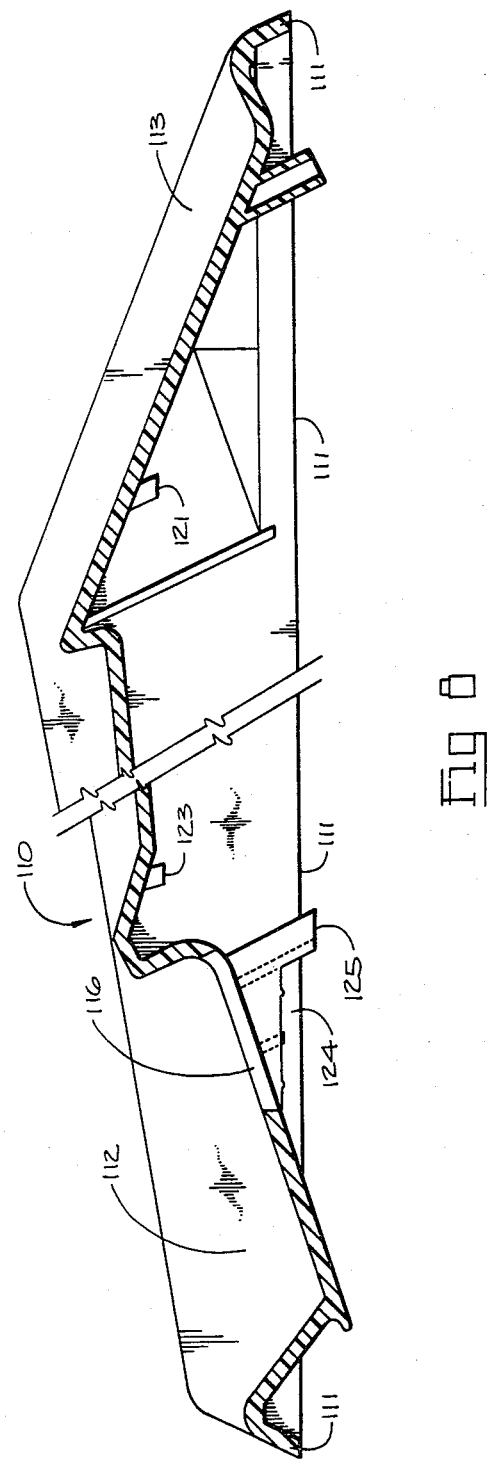

4,292,477

TELEPHONE SET BASE FOR BOTH WALL AND DESK MOUNTING

BACKGROUND OF THE INVENTION

This invention relates to a telephone set base, and particularly to an electronic telephone set base, capable of both wall and desk top mounting.

Telephone set bases are increasingly being made of molded plastic which is both light and easily formed. With conventional telephone sets, using discrete components each of which can have a fair amount of weight, for example the normal ringer, transformer and other parts, the base remains in position even when the handset is removed and does resist a substantial amount of pull on the handset cord.

With electronic telephones, the components are lighter and the heavier components of conventional telephone sets are no longer used. It has therefore become usual to include one or more metal members to provide weight, to give improved stability.

SUMMARY OF THE INVENTION

The present invention provides an arrangement whereby the metal member or members form part of an acoustic chamber for the speaker which produces the ringing tone. The electronic components are positioned on a printed circuit board which fits over the speaker, and a flexible circuit carries the majority of the remaining components and also acts to connect to the printed circuit board and to those components not on either the printed circuit board or the flexible circuit.

A telephone set base, in accordance with the present invention, comprises an elongate molded plastic base plate having a base member and upstanding peripheral rim; an enclosed recess extending upward from the base member for positioning therein of a plug for inserting in a wall jack; an inlet at a rear end for a line cord in the desk-top mounting configuration and a slot in the base member connecting the inlet and the enclosed recess; a mounting recess for a jack immediately adjacent to one side of the recess and an aperture in the side of the recess for passage of a short line cord from a jack at said jack mounting recesses to said recess; an acoustic chamber defined by said base member and a weight spaced from the base member, the acoustic chamber opening to a side of the base plate; a speaker mounted on said weight; a printed circuit board extending over said acoustic chamber and around said speaker; a flexible circuit member having at least one jack attached thereto and interconnecting said speaker and said circuit board; and a battery housing in the base plate. The flexible circuit member may also carry a switch for varying the loudness of the ringing tone. A further inlet at the front end and a slot in the base member provide access for a handset cord to a further jack which may also be mounted on the flexible circuit member.

BRIEF DESCRIPTION OF THE DRAWINGS

The invention will be readily understood by the following description of an embodiment, by way of example, in conjunction with the accompanying drawings, in which:

FIG. 3 is a cross-section on the line III—III of FIG. 2;

FIG. 4 is an end view of the base plate in the direction of arrow A in FIG. 2;

FIG. 5 is an end view of the base plate in the direction of arrow B in FIG. 2;

FIG. 6 is a plan view of the flexible circuit member;

FIG. 7 is a bottom plan view of a top housing to suit the base plate of FIGS. 1 to 6; and FIG. 8 is a cross-section on the line VIII—VIII of FIG. 7.

DETAILED DESCRIPTION OF THE PREFERRED EMBODIMENTS

Figure 1:
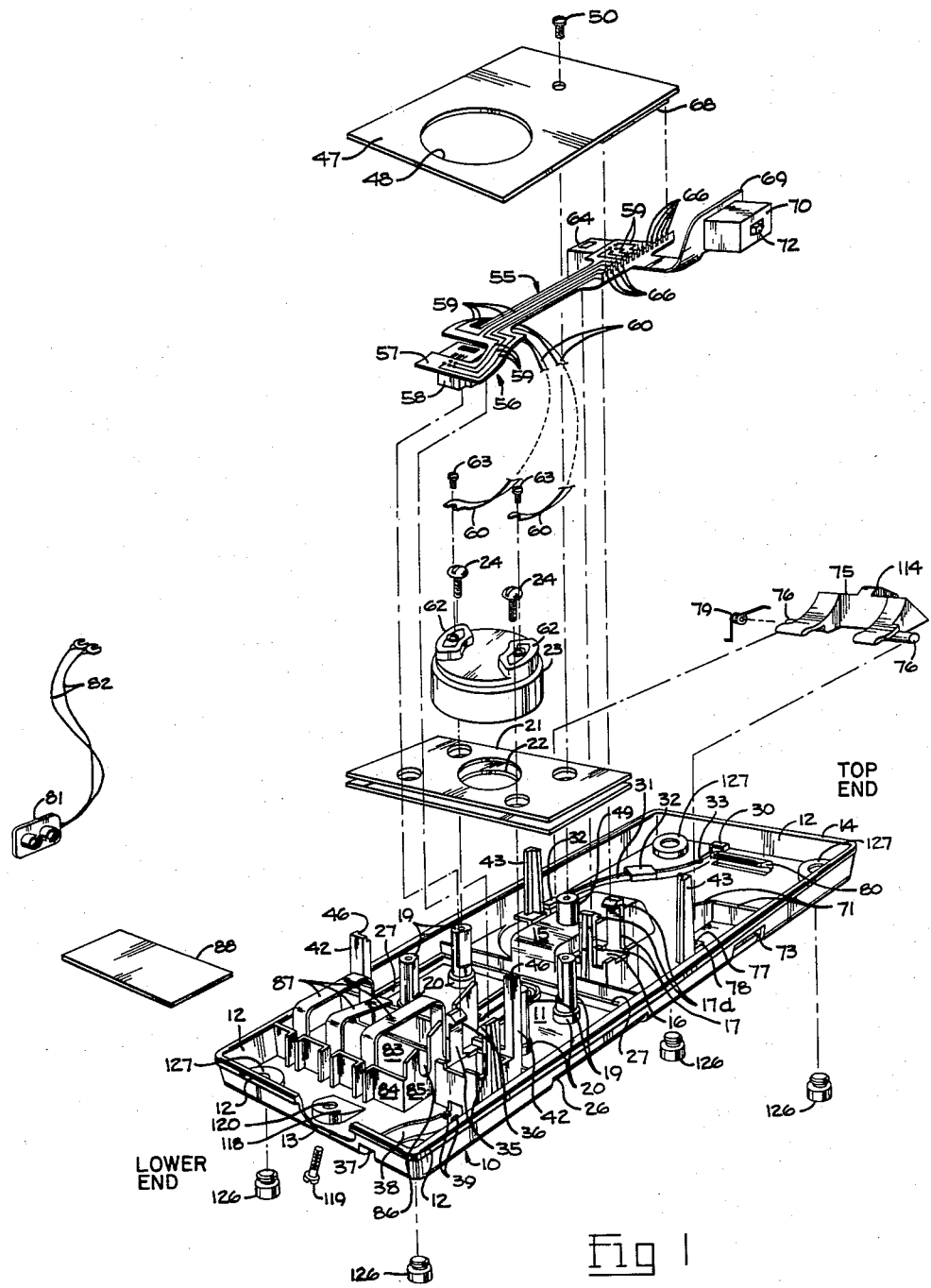
FIG. 1 is an exploded perspective view of a base plate.
Figure 2:
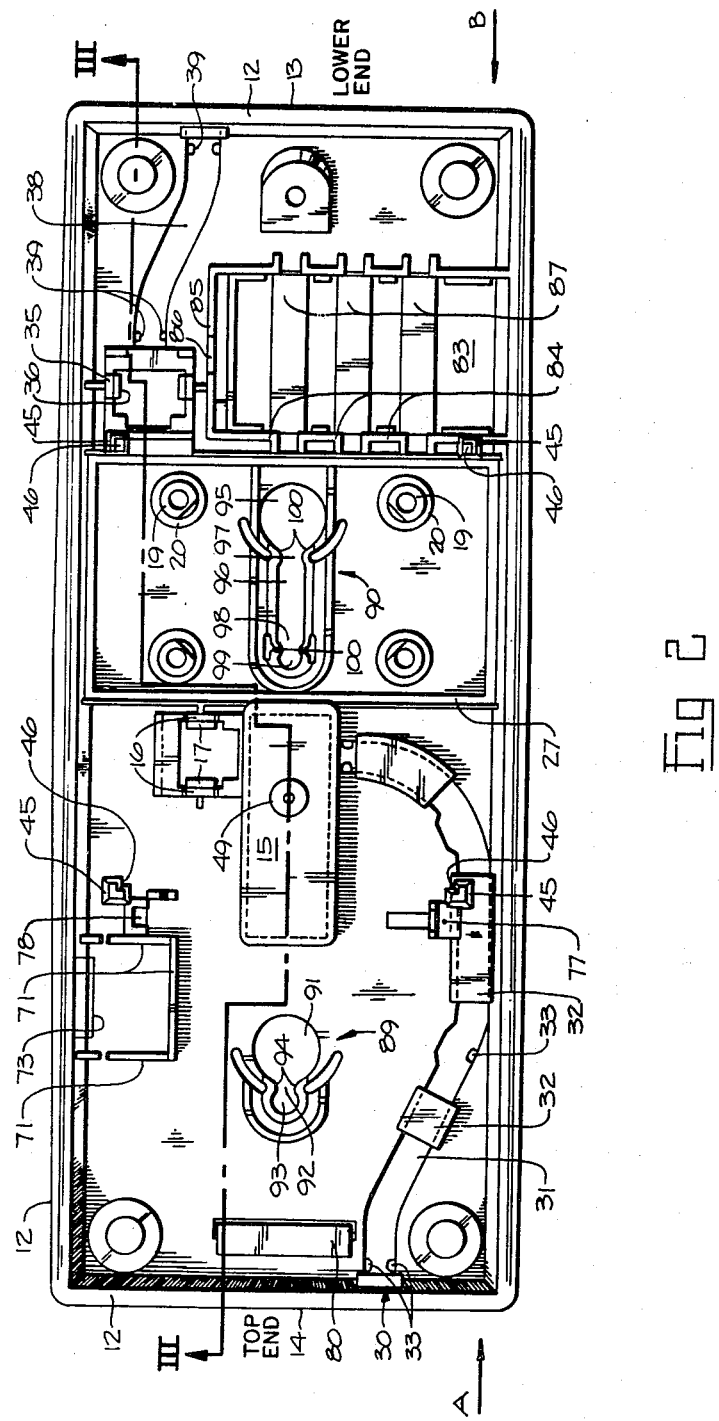
FIG. 2 is a top plan view of the base plate of FIG. 1.

As illustrated in FIGS. 1 to 5, a telephone set base comprises a base plate 10 having a flat base member 11 with an upstanding peripheral rim 12. In the wall mounting position, end 13 will be the lower end and end 14 the top end, and in the desk top mounting position end 13 will be the front end and end 14 the rear end. This terminology will be used hereinafter.

Situated generally on the longitudinal axis of the base member 11 and slightly nearer the top end 14 is enclosed recess 15. Recess 15 extends through the base member and has an opening in the bottom surface of the base member. The recess in the wall mounting arrangment, houses a plug on one end of a short cord, the plug being inserted in a wall outlet jack when the telephone set is mounted on a wall or other vertical or substantially vertical, surface. Positioned alongside the recess 15 is a jack mounting position defined by a further recess 16 and extending upward therefrom two snap-in members 17. The members deflect apart when a jack is inserted and have hooked ends 17a which snap over the jack when in position. An aperture in the side wall between recess 15 and recess 16, seen at 18 in FIG. 3, provides for access between the jack mounting and the recess 15 and the above mentioned short cord passes through the aperture 18 and has at its other end a plug for insertion in the jack.

Situated forward, or lower, than the recess 15 are four posts 19 extending upwardly from the top surface of the base member. The posts have a short portion 20 of a slightly larger diameter than the remainder of the posts, forming a ledge on each post spaced a short distance from the top surface of the base member. Positioned on the posts is a weight assembly 21 in the example being two flat pieces of steel. One thicker piece can be used, the thinner pieces being easier to fabricate. The weight 21 rests on the top of the enlarged portions 20 of the posts.

The weight 21 has an aperture 22 and a speaker or transmitter 23 rests on the weight 21 over the aperture 22, being positioned by the posts 19. Screws 24 pass through two of the apertures in weight assembly 21 and long side of the speaker. They screw into two of the posts to hold down the speaker by engagement of the heads of the screws 24 with the top ledge of the speaker 23. An elongate slot or aperture 26 is formed at the side of the base plate communicating with the acoustic chamber defined between the base member 11 and the weight 21. A rib 27 extends from the base member 11 in cooperation with the periphery of the weight to enclose the acoustic chamber.

At the top, or rear, end 14 is an inlet 30 through the rim 12. Extending between inlet 30 and the recess 15 is a slot 31 in the base member 11. The slot is covered for parts of its length by bridging members 32, and local protrusions 33 in the sides of the slot maintain a line cord in the slot. A line cord enters through the inlet 30, along the slot 31 and through a small aperture, not shown, in the side of the recess. The line cord passes across the recess, out through aperture 18 and a plug on the end of the cord is inserted into the jack positioned between the members 16. This arrangement would be used for desk top mounting.

Toward the lower or front end 13, and positioned towards the side of the base plate are two further snap-in members 35 having hooked ends 36. A further jack is mounted between the members 35, for a handset cord. A further inlet 37, is formed in the rim 12 at the end 13, and a slot 38 formed in the base member 11 extends from the inlet 37 to the further jack position. A handset cord can be attached by inserting a plug at the end of the cord into the jack and the cord pushed into the slot 38. Local protrusions 39 in the sides of the slot maintain the cord in position in the slot. This arrangment is used for both wall and desk top mounting.

Extending upwardly from the base member 11, close to the side portions of the rim 12, are two pairs of pillars 42 and 43. Pillars 42 have square recesses 46 at their upper ends, and position the corners of a printed circuit board 47, the printed circuit board resting on the other pillars 43. The printed circuit board has an aperture 48 which passes over the speaker 23 and the board also rests on a short post 49 extending upward from the top of the recess 15. A screw 50 screws into the post 49 and holds down the printed circuit board.

Extending alongside the speaker, or ringer 23, is a flexible circuit member 55. The circuit member 55 extends under the printed circuit board 47, and is seen in more detail in FIG. 6, which should be considered in conjunction with FIG. 1. The flexible circuit member is long and narrow with enlargements at each end and a protruding portion at an intermediate position. Starting at the left hand end, in FIG. 6, and which is also the left hand end in FIG. 1, there is a U shaped section 56 and to the outer leg of this portion, indicated at 57, is attached a jack 58. FIG. 6 shows the flexible circuit member only, without attached components, these being seen in FIG. 1. Also the circuit pattern is not shown in FIG. 6 but is indicated at 59 in FIG. 1.

Proceeding along the flexible circuit member, to the right, two narrow elongate strips 60 are formed, by slots 61. These strips 60 connect to the terminals 62 on the speaker 23, by screws 63. At the intermediate position a further jack 64 is attached, at 65, and also a plurality of terminal pins 66 are attached to the protruding portion 67. This portion 67 is bent upward and the pins 66 insert into a connector 68 on the printed circuit board 47.

At the extreme right hand end is a portion 69 to which is attached a switch 70 for controlling the loudness of the ringer or speaker 23. For example, a three position switch can be used, giving low, medium and high levels.

The flexible circuit member 55 is assembled by snapping the two jacks 58 and 64 into position at members 35 and 16 respectively. The strips 60 are connected to the speaker 23 and the switch 70 sits in a recess formed by walls 71 on the base member, with the switch actuating member 72 extending through an aperture 73 in the rim 12. The pins 66 are inserted into the connector 68. To permit the switch 70 to be positioned in its recess, the portion 69 of the flexible circuit member is bent down and round, out of the general plane of the flexible circuit member.

Pivotally mounted toward the top or rear end 14 is a hook switch actuating member 75. Member 75 is pivotally mounted by cylindrical pivot members 76. One pivot member 76 is positioned in a covered recess 77, while the other pivot member 76 is positioned in a groove 78. A tension spring 79 biases the member 75 upwards about the pivot members. A hook switch, not shown is mounted on the base member, an edge of the hook switch assembly engaging under a lip 80 extending above the top surface of the base member.

Towards the lower or front edge 13 is formed a battery housing. This comprises an aperture 83 in the base member 11, side walls 84 and rear wall 85 extend around the aperture. Ribs 87 extending across from the side walls 84. The aperture 85 is closed by a sliding cover 88 which slides in from the side of the base member. A terminal block 81 and leads 82 connect the battery to the printed circuit board. A slot 86 extends down from the inclined top edge of rear wall 85. Slot 86 locates the leads 82 and the top edge of the rear wall and engages with the top housing of the telephone set and prevents the terminal block 81 from being pushed into the interior of the set.

The telephone set is mounted on a wall by formations in the base member 11. As seen more clearly in FIG. 2, two apertures of "key-hole" formation 89 and 90, are formed in the base member. What would be the top aperture 89, has a main circular portion 91 and waisted slot portion 92 opening into a further circular portion 93 of smaller diameter than portion 91 but larger than the width at position 92. The waisted portion 92 is defined by opposed resilient arcuate members 94 forming parts of the periphery of the circular portion 91. The lower aperture 90, is more elongate in formation, having a circular portion 95, an elongate slot 96 having waisted portions 97 and 98 at each end and a smaller circular portion 99. The waisted portion 97 is formed by opposed resilient arcuate members 100, as for aperture 89, while the waisted portion 98 is formed by opposed arcuate members 101. By providing the elongate aperture 90, different spacing of mounting studs can be accommodated. To mount the set, the heads of the mounting studs are inserted through the portions 91 and 95 and the base slid down, the heads of the studs being on the inner surface of the base member. For more widely spaced studs, both heads are entered through portions 91 and 95 at the same time and the stems of the studs snap past the portions 92 and 97, the top stud then being in position 93 and the bottom stud in the slot 96. For closely spaced studs, the head of the lower stud is first entered through circular portion 95 of the lower aperture 90, the base slid down with the neck of the lower stud snapping past waisted portion 97, then the head of the upper stud is entered through the circular portion 91 of upper aperture 89. Further downward sliding of the base snaps the studs through waisted portions 92 and 98.

Many of the components, for example the printed circuit board 47, ringing control switch 70, hook switch and et seq are finally held down in place by the top housing.

FIGS. 7 and 8 illustrate a top housing 110 which will fit into the base plate 10. The top housing has a peripheral rim 111 which engages with the rim 12 of the base plate. A recess 112 at one end, the top end where wall mounted and rear end on a desk, is adapted to hold the transmitter end of a handset while the receiver end rests in a recessed port 113 at the other end. An extension or rib 114 on the hook switch actuating member 75 extends through slot 116 in the top housing in the recess 112, for actuation by the handset.

The top housing has various items which engage with items mounted on the base plate or with the base plate. Thus boss 117 contacts a boss 118 on the base plate and a screw 119 passes through a hole 120 in boss 118 and screws into the boss 117. Boss 121 holds down the printed circuit board 47 at one end. The internal surface of the housing generally in the area indicated at 122 contacts the top surface of end wall 85 of the battery housing. Two bosses 123 also contact the printed circuit board 47. A web 124 holds down the switch 70 controlling the loudness of the ringer and a rib 125 holds down the pivotal member 76 of the hook switch actuating member 75 which rests in groove 78.

Rubber or plastic feet 126 insert into hollow bosses 127 in the base plate.

What is claimed is:

1. A telephone set base for both wall and desk mounting, comprising:
   an elongate molded plastic base plate having a base member and an upstanding peripheral rim extending around the base member, said rim including a lateral slot therein;
   an enclosed recess extending upward from said base member for containing therein a first modular plug adapted for plugging into a wall outlet jack;
   a further recess extending upward from said base member adjacent to said enclosed recess, said further recess including snap means for retention of a modular jack and an aperture defining a passage communicating with said enclosed recess for receiving a short first line cord connected between the first modular plug and a second modulator plug connected to the modular jack;
   said base plate including an inlet at one end for a long second line cord and a cord slot connecting said inlet and said enclosed recess for receiving the second line cord as it passes from said inlet to said further recess;
   a flat weight having an aperture therein and being spaced from said base member, defining therewith an acoustic chamber, said chamber being enclosed at its periphery and said lateral slot in said peripheral rim opening into said acoustic chamber;
   a speaker mounted on said weight at said aperture;
   a printed circuit board mounted over said flat weight; and
   a flexible circuit member having at least one modular jack mounted thereon, said flexible circuit member interconnecting said speaker and said printed circuit board, said modular jack being retained at said further recess by said snap means;
   whereby said telephone set base is adapted to have the short first line cord extend from said enclosed recess to said further recess with said first modular plug on one end of the cord being positioned in said enclosed recess and with said second modular plug on the other end of said first line cord being connected to said modular jack retained by said snap means above said further recess when the telephone is in a wall mounted form, and the telephone base set base is adapted to have the long second line cord enter said inlet and pass along said cord slot to said enclosed recess and then through said passage to said further recess where it is connected with said modular jack retained by said snap means above said further recess when the telephone is in a desk mounted form.

2. A telephone set base as claimed in claim 1, including a battery housing in said base plate and means for connecting said battery to said printed circuit board.

3. A telephone set base as claimed in claim 1, including a third recess extending upward from said base member and snap means associated with said third recess for retention of a modular jack; a further modular jack mounted on said flexible circuit member and mounted at said third recess by the snap means associated therewith; a further inlet at the other end of said base plate and a further cord slot in said base member extending from said further inlet to said third recess for a handset cord to enter said base through said second inlet and extend along said further slot to said third recess whereby a modular plug on said handset cord can plug into said further modular jack.

4. A telephone set base as claimed in claim 3, said inlet at said one end being at a front end in a desk mounting mode and a lower end in a wall mounting mode, and said further inlet being at a rear end in a desk mounting mode and an upper end in a wall mounting mode.

5. A telephone set base as claimed in claim 3, including local protrusions on sides of said further cord slot.

6. A telephone set base as claimed in claim 1, further including means for controlling the volume of said speaker, said volume control means being mounted on said flexible circuit member; a plurality of walls extending upward from said base member to define a recess for reception of said volume control means, said recess being adjacent said peripheral rim, and an aperture in said peripheral rim, said volume control including an actuating member extending through said aperture from the volume control means recess.

7. A telephone set base as claimed in claim 6, including a top housing on said base plate, said top housing including members extending down from an inner surface, said members engaging with and holding down said volume control means.

8. A telephone set base as claimed in claim 1, said printed circuit board having an aperture therein which passes over the speaker.

9. A telephone set base as claimed in claim 8, including pillars extending upwards from said base member, outside said acoustic chamber, said printed circuit board resting on said pillars.

10. A telephone set base as claimed in claim 9, including a top housing on said base plate, said top housing including protrusions extending downward from an inner surface, said protrusions resting on said printed circuit board to hold the board in position.

11. A telephone set base as claimed in claim 1, including a plurality of posts extending upward from said base member within the periphery of the acoustic chamber, each post having a bottom portion of larger diameter than the remainder to form a ledge, said weight having a plurality of holes therethrough, a hole engaging over each pillar, the weight resting on the ledge formed on each pillar.

12. A telephone set base as claimed in claim 1, including a top housing on said base plate, said top housing including a peripheral rim in engagement with said peripheral rim on said base plate, a recess at one end for holding the receiver end of a handset and a further recess at the other end for holding the transmitter end of the handset.

13. A telephone set base as claimed in claim 1 including two mounting apertures in said base member, each said mounting aperture of keyhole formation and comprising a circular aperture portion and a waisted slot portion, the slot portion narrower than the diameter of the circular aperture portion and positioned above the circular aperture portion when the base is in a wall mounting position, said waisted slot portion defined by two spaced resilient members.

14. A telephone set base as claimed in claim 13, said resilient members each comprising a first arcuate portion defining part of the circumference of the circular aperture portion and an end portion curved around and outwards whereby the two resilient members present convex surfaces in opposition.

15. A telephone set base as claimed in claim 13, said mounting apertures spaced apart along a longitudinal axis of the base plate, one of said apertures positioned near an end of the base plate, said end being the top end in a wall mounting mode, the other of said mounting apertures having an elongate slot portion including two waisted portions, one at each end of the slot portion, a first waisted portion immediately adjacent to the circular aperture portion and defined by said two spaced resilient members, the second waisted portion defined by opposed resilient, arcuate members.

16. A telephone set base as claimed in claim 1, including at least one bridging member over said cord slot.

17. A telephone set base as claimed in claim 1, including local protrusions on sides of the cord slot for retaining a cord in the slot.

* * * * *